US010037313B2

(12) United States Patent
Wang et al.

(10) Patent No.: US 10,037,313 B2
(45) Date of Patent: Jul. 31, 2018

(54) AUTOMATIC SMOOTHED CAPTIONING OF NON-SPEECH SOUNDS FROM AUDIO

(71) Applicant: Google Inc., Mountain View, CA (US)

(72) Inventors: Fangzhou Wang, Sunnyvale, CA (US); Sourish Chaudhuri, San Francisco, CA (US); Daniel Ellis, New York, NY (US); Nathan Reale, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 15/245,152

(22) Filed: Aug. 23, 2016

(65) Prior Publication Data

US 2017/0278525 A1 Sep. 28, 2017

Related U.S. Application Data

(60) Provisional application No. 62/313,069, filed on Mar. 24, 2016.

(51) Int. Cl.

| | |
|---|---|
| ***G10L 15/00*** | (2013.01) |
| ***G06F 17/24*** | (2006.01) |
| ***G10L 25/84*** | (2013.01) |
| ***G10L 15/20*** | (2006.01) |
| *G10L 25/78* | (2013.01) |
| *G10L 21/06* | (2013.01) |

(52) U.S. Cl.

CPC ............ *G06F 17/241* (2013.01); *G10L 15/20* (2013.01); *G10L 25/84* (2013.01); *G10L 2021/065* (2013.01); *G10L 2025/783* (2013.01)

(58) Field of Classification Search

None

See application file for complete search history.

(56) References Cited

U.S. PATENT DOCUMENTS

2005/0234906 A1* 10/2005 Ganti ................ G06F 17/30569
2007/0276656 A1* 11/2007 Solbach ............. G10L 19/0204 704/200.1
2011/0305384 A1* 12/2011 Aoyama ........... G06K 9/00281 382/159
2015/0070150 A1* 3/2015 Levesque ............... G06F 3/016 340/407.1

* cited by examiner

*Primary Examiner* — Kevin Ky
(74) *Attorney, Agent, or Firm* — Young Basile Hanlon & MacFarlane, P.C.

(57) ABSTRACT

A content server accessing an audio stream, and inputs portions of the audio stream into one or more non-speech classifiers for classification, the non-speech classifiers generating, for portions of the audio stream, a set of raw scores representing likelihoods that the respective portion of the audio stream includes an occurrence of a particular class of non-speech sounds associated with each of the non-speech classifiers. The content server generates binary scores for the sets of raw scores, the binary scores generated based on a smoothing of a respective set of raw scores. The content server applies a set of non-speech captions to portions of the audio stream in time, each of the sets of non-speech captions based on a different one of the set binary scores of the corresponding portion of the audio stream.

17 Claims, 8 Drawing Sheets

Content System 185
Content Store 140
Content Items 145
Speech Captions 150
Non-Speech Captions 155
Content Server 110
Non-Speech Caption Classifier 115
Caption Smoother 120
Caption Server 180
Caption Display Module 125
Network 190
Client Device 170
Content Presenter 175
100

Plot 300
Score for Class "laughter" over length of content
Classifier Score 320
1
0
1 2 3...
...20...
...30...
...
...
...
N
Sample Window Number 310

Plot 600
Smoothed Score for
Class A and B
Smoothed Plot
For Class
"applause" 610
Smoothed Plot
For Class
"music" 620
On
Off
Binary Score 520
1 2 3...
...20...
...30...
...
...
...
N
Sample Time Window 210

AUTOMATIC SMOOTHED CAPTIONING OF NON-SPEECH SOUNDS FROM AUDIO

CROSS REFERENCE TO RELATED APPLICATIONS

This application claims the benefit of U.S. Provisional Application No. 62/313,069, filed on Mar. 24, 2016, which is incorporated herein by reference in its entirety.

TECHNICAL FIELD

The disclosed embodiments relate generally to computer-implemented methods for audio captioning, and more specifically, to automatically transcribing captions for non-speech sounds in an audio stream.

BACKGROUND

When consuming a content item, such as a video stream or an audio stream in many cases the content stream may include audio with spoken dialogue or other sounds. However, in many cases these content items do not have accompanying caption data visually indicating the content of the audio in the content item. This creates a great disadvantage for those who are hearing impaired, i.e., deaf or hard of hearing (est. at approx. 360 million individuals worldwide). These hearing impaired individuals are not able to access the audio content in the content item. Additionally, while some content items are accompanied with caption data for the speech portions of the audio of the content items, fewer content items are accompanied with captions describing the non-speech aspects of the audio of the content items. However, the impact of the non-speech items on the enjoyment and comprehension of the content item may be significant.

SUMMARY

In one embodiment, a computer-implemented method for automatically generating non-speech captions comprises accessing an audio stream. The method further comprises inputting portions of the audio stream into one or more non-speech classifiers for classification, the non-speech classifiers generating, for one or more of the portions of the audio stream, a set of raw scores representing likelihoods that the respective portion of the audio stream includes an occurrence of a particular class of non-speech sounds associated with each of the non-speech classifiers.

The method further comprises generating a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time; and The method further comprises applying a set of non-speech captions to portions of the audio stream in time, each of the sets of non-speech captions based on a different one of the set binary scores of the corresponding portion of the audio stream.

In one embodiment, a computer program product comprising a non-transitory computer readable storage medium having instructions encoded thereon that, when executed by a processor, cause the processor to input portions of the audio stream into one or more non-speech classifiers for classification, the non-speech classifiers generating, for one or more of the portions of the audio stream, a set of raw scores representing likelihoods that the respective portion of the audio stream includes an occurrence of a particular class of non-speech sounds associated with each of the non-speech classifiers.

The instructions further cause the processor to generate a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time.

The instructions further cause the processor to apply a set of non-speech captions to portions of the audio stream in time, each of the sets of non-speech captions based on a different one of the set binary scores of the corresponding portion of the audio stream.

In one embodiment, a system comprises a content system coupled to a network and configured to access an audio stream. The content system is further configured to input portions of the audio stream into one or more non-speech classifiers for classification, the non-speech classifiers generating, for one or more of the portions of the audio stream, a set of raw scores representing likelihoods that the respective portion of the audio stream includes an occurrence of a particular class of non-speech sounds associated with each of the non-speech classifiers.

The content system is further configured to generate a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time. The content system is further configured to apply a set of non-speech captions to portions of the audio stream in time, each of the sets of non-speech captions based on a different one of the set binary scores of the corresponding portion of the audio stream.

The system further comprises a client device coupled to the network and configured to receive content from the content system; receive speech captions and non-speech captions; and present the content with the speech captions and non-speech captions to a user.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

The system described herein provides the advantage of automatically generating captions for non-speech sounds in audio. In particular, for a video file with accompanying audio, the inclusion of captions only for speech sounds may not be sufficient in conveying the content of the video file to a person who is hard of hearing. The non-speech sounds in the video provide important context and supplemental information regarding the video file, and thus it is important for a person to know the types of non-speech sounds in the video. However, the manual entry of non-speech captions is time consuming and expensive. This is especially true in the case of a content system that accepts a large number of user submitted content items, as described here. It may be difficult to manually add captions to the multitude of content items that are constantly uploaded to such a system.

Furthermore, the captioning system described here also presents non-speech captions in an manner that is read by a viewer. In particular, the smoothing of raw scores generated by a set of classifiers allows for the presentation of non-speech captions that appear natural and non-obtrusive and are visually acceptable, as they do not fluctuate or change frequently and are easily readable and understandable.

Thus, with the implementation of such a system, those users that are hard of hearing, or those users who are unable to hear an audio track for some other reason (e.g., noisy environment, a requirement that sound not be played) can be able to fully comprehend and enjoy the audio of a content item by being presented with the automatically generated non-speech captions that are generated by this system.

II. System Architecture

Figure 1:
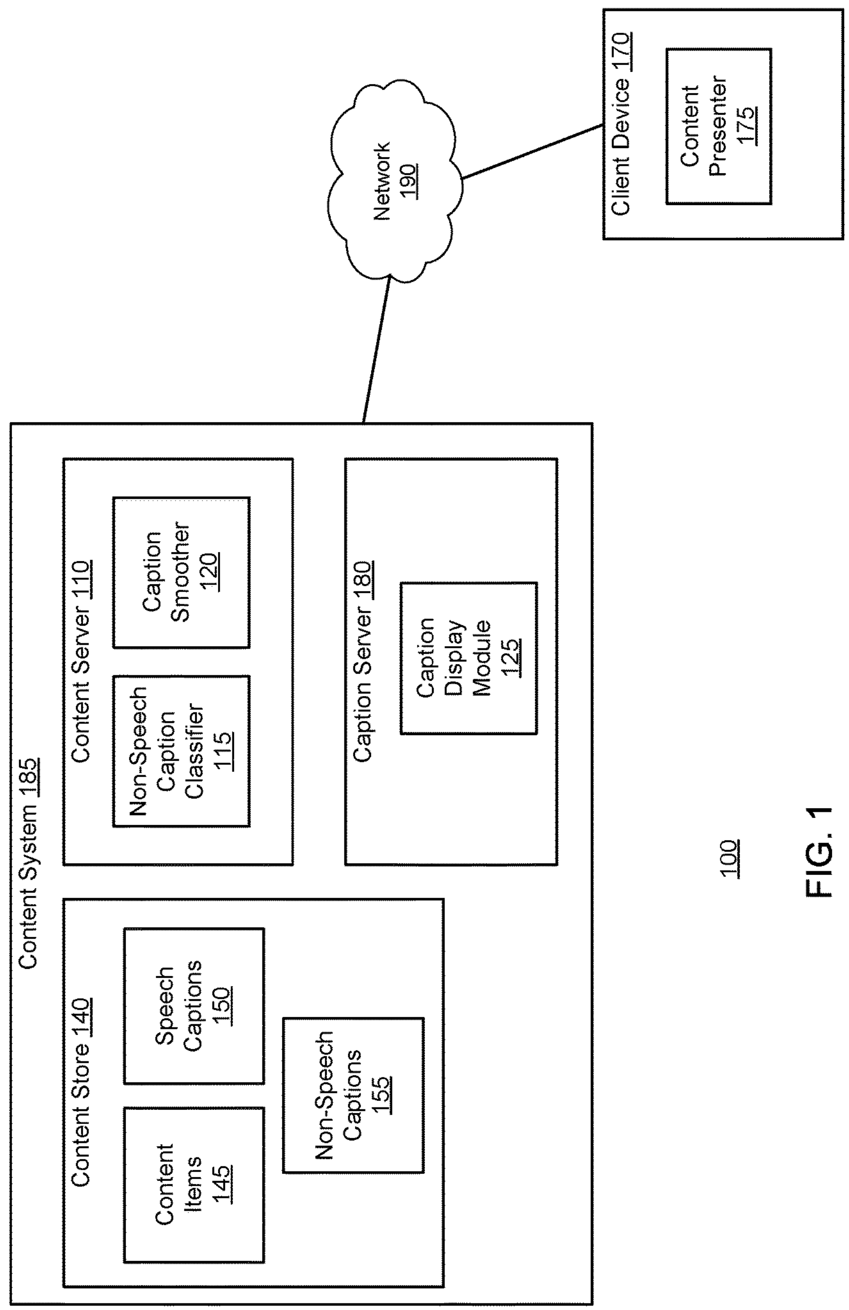
FIG. 1 is a high-level block diagram of an environment for automatic non-speech captioning, according to an embodiment.

FIG. 1 is a high-level block diagram of an environment 100 for automatic non-speech captioning, according to an embodiment. FIG. 1 illustrates a content system 185 including a content store 140, a content server 110, and a caption server 180. The content system 185 is connected to a client device 170 by network 190. While certain elements are shown in FIG. 1, in other embodiments the environment may have different elements. Furthermore, the functionalities between elements may be distributed in a different manner in other embodiments, to different or multiple modules.

Client Device and Network

The client device 170 is a computing device that may access content from the content server 110. A user of the client device 170 can access a video from the content server 110 by using the client device 170 to browse a catalog of content, conduct searches using keywords, review play lists from other users or the system administrator (e.g., collections of content forming channels), or view content associated with particular user groups (e.g., communities). Additionally, in some embodiments, the client device 170 may also be used to upload content to the content server 110. The client device 170 may be a desktop, laptop, smart phone, tablet, wearable device, television, set top box, and the like. Although FIG. 1 illustrates only a single client device 120, it should be understood that many client devices (e.g., millions) can communicate with the video hosting system 100 at any time.

In one embodiment, the client device 170 accesses content from the content server 110 and presents the content to the user via the content presenter 175. In one embodiment, the content presenter is accessed through a web browser includes a video player (e.g., an HTML5-compliant player). Furthermore, the content presenter 175 may be able to present to the user the content concurrently with captions received from the content server 110. These captions may be for speech and/or non-speech sounds in the content. The content presenter 175 may be a web browser that allows the user to view web pages and content provided by the content server 110.

Network

The network 190 represents the communication pathways between the client device 170 and the content server 110. In one embodiment, the network 190 is the Internet, but may also be any network, including but not limited to a LAN, a MAN, a WAN, a mobile, wired or wireless network, a cloud computing network, a private network, or a virtual private network, and any combination thereof. In addition, all or some of links of the network 190 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Content System—Content Store

The content store 140 of the content system 185 stores content items 145. The content items 145 may include video and/or audio content items of various durations, resolutions, and so on. For example, a content item 145 may include a 4K video file, or a 360-degree video file, or a stereoscopic video file. Each content item may include an audio stream, which is an audio part of the content item (although the term "stream" is used here, it does not necessarily indicate that the audio is streaming). The content store 140 may also and associated metadata for the content items 145, including speech captions 150 and non-speech captions 155 associated with the content items 145. Each content item 145 that is stored in the content store 140 may also be stored with associated with metadata, such as a title, description, responsive comments, ratings, and so on.

The speech captions 150 include transcribed text of the speech sounds in a number of content items 145 in the content store 140. In one embodiment, the speech captions 150 include entries, each including a start timestamp, an end timestamp, and text that is a transcription of the speech sound present in a content item between the start timestamp and end timestamp. For example, an entry may have a start timestamp of 00:00:45 seconds, an end timestamp of 00:00:46 and a text of "Hello listeners." Note that the text may not in all cases accurately represent the speech sounds in the corresponding portion of the content item, due to transcription, timing, or other errors.

The non-speech captions 155 include indicators for the non-speech sounds in a number of content items 145 in store 140. In one embodiment, the non-speech captions 155 include entries each including a start timestamp, an end timestamp, and a indicator indicating the non-speech sound. For example, the start timestamp and end timestamp may be similar to the example described above for speech captions 150, while the indicator may indicate the non-speech sound corresponding to human laughter In one embodiment, the indicator stored in 155 may be a label that directly indicates the non-speech sound (e.g., "Laughter"). In other embodiments, the indicator does not directly describe the non-speech sound, but is instead a code that references a class of non-speech sound. For example, instead of the indicator being the label of "Laughter," it may instead be a code such as "15," which may dereferenced in a table or other data store to determine that "15" represents the non-speech sound of laughter. This may be advantageous as the non-speech caption may be presented in different languages, and so each language may have an associated table associating a label describing a class of non-speech sound with the code associated with that class of non-speech sound.

Content System—Content Server

The content server 110 provides access to, viewing and listening of, and allows the uploading of the content items 145 (not shown). The content server 110 allows users to access the content items 145 via searching and/or browsing interfaces. The content items 145 can be obtained from user uploads of content, from searches or crawls of other websites or databases of content, or the like, or any combination thereof. For example, in one embodiment the content server 110 can be configured to allow for user uploads of content.

The content server 110 processes search queries received from a user. A search query may include search criteria, such as keywords that may identify videos the user is interested in viewing. The content server 110 may use the search criteria, for example, to query the metadata of and/or entities associated with all the content items 145 stored in the content store 140. The search results from the query are transmitted by the content server 110 to the client device 170.

The content server 110 may receive content from client devices 170. The processing of the received content may include assigning an identification number to the newly received content. Other steps of processing the received content may include formatting (e.g., transcoding), compressing, metadata tagging, content analysis, and/or other data processing methods. The content server 110 may receive in addition to the content accompanying caption data. The caption data may indicate the start and end times of captions corresponding to speech and non-speech sounds in the content. The content may also be associated with other information, such as title, description, content type, author, ratings, and so on. The content server 110 stores the content (and any associated metadata) in the content store 140.

The content server 110 may serve content in a similar fashion to the YouTube™ website; other video hosting websites are known as well, and can be adapted to operate according to the teaching disclosed herein.

The content server 110 also performs automatic captioning of non-speech sounds in the content items 145. To automatically generate the non-speech captions 155 for non-speech sounds for the content items 145, in one embodiment, the content server 110 includes a non-speech caption classifier 115 and a caption smoother 120. The content server 110 may generate the combined set of captions dynamically upon presentation of the content item, or the content server 110 may generate the combined captions when the content item is uploaded to the content server 110.

The non-speech caption classifier 115 scores the probability that one or more non-speech sounds in the audio of a content item belong to one or more non-speech classes. Each non-speech class describes or indicates a particular class of non-speech sounds. For example, a class could indicate the non-speech sound of laughter. Additional classes may indicate non-speech sounds that include, but are not limited to: gunshots, applause, music, ringing, door open/close, whistling, footsteps, explosions, water, creaking, fire crackling, barking, meowing, and so on. In one embodiment, the non-speech caption classifier 115 discerns between any from a handful of different non-speech classes, to upwards of 150 different non-speech classes or more. Although only a single non-speech caption classifier 115 is referenced in this description, the classifier 115 generally refers to a set of classifiers, each trained to classify a different type of non-speech sounds.

To do this, the non-speech caption classifier 115 splits an audio track of a content item into portions in time, with each portion being a shifted a short interval from a prior portion of the audio, and each portion being of a particular duration. For each portion, the non-speech caption classifier 115 may determine a raw score for each class of non-speech sound for that portion. The raw score indicates a likelihood that the portion of sound includes the class of non-speech sound. For example, if the class of non-speech sound is laughter, the non-speech caption classifier 115 determines the likelihood that a portion of the audio includes the non-speech sound of laughter. The raw score may range from zero to 1, with 1 being the highest likelihood (e.g., 100%). Additional details regarding the non-speech caption classifier 115 and the outputted raw scores are described with reference to FIGS. 2 and 3.

The caption smoother 120 smooths the raw scores generated by the non-speech caption classifier 115 in order to generate binary (e.g. on/off) scores for each class of non-speech sound that may potentially be added as a caption of a non-speech sound. As the raw scores may fluctuate significantly over a short period of time (e.g., 1 second), using the raw scores directly to determine whether a non-speech sound has occurred in a portion of the audio may result in captions that are sporadic and which also fluctuate significantly. This is visually undesirable. Instead, the caption smoother 120 smooths the raw scores to generate binary scores indicating either an off or on state for the occurrence of the particular class of non-speech sound.

The caption smoother 120 performs the smoothing such that the binary scores that are generated do not fluctuate significantly, but instead are more stable and may be used to generate captions for the non-speech sounds. In one embodiment, the caption smoother 120 generates the binary scores for a class of non-speech sound for each portion of the audio of a content item by using the raw score of that portion along with the raw scores of its surrounding portions in time for that same class.

In one embodiment, the caption smoother 120 uses a modified Viterbi algorithm to perform this smoothing. Each class of non-speech sound has two states: an on state, and an off state. These represent the binary score indicating whether the class of non-speech sound is "on" (i.e., present or occurring) in the portion of the audio, or "off" (i.e., not present or not occurring). Each portion of the audio corresponds to an observation in the sequence of observations, with the total number of observations equal to the total number of portions for the audio in the respective content item. The caption smoother 120 determines which of the hidden states of on or off are most likely throughout the sequence of observations, thus determining the Viterbi path between the on and off states. Additional details regarding the caption smoother 120 and the smoothing process are described with reference to FIG. 4.

Once the caption smoother 120 determines the Viterbi path for a class of non-speech sounds for the audio of a content item, the resulting Viterbi path indicates the most likely on or off states for each portion of the audio for the content item. This on or off indicator for each portion is the binary score (e.g., on is 1 and off is 0). For example, if the audio of a content item has 5000 portions, each portion may include a binary score indicating whether a class of non-speech sound is present (on) or not present (off) in that portion of the audio. Each portion may have a separate binary score for each class of non-speech sound that is analyzed by the system. Additional details regarding the output binary score are described with reference to FIGS. 5 and 6.

Although the caption smoother 120 uses the Viterbi algorithm to smooth the raw scores in this instance, in other embodiments the caption smoother 120 uses a different smoothing process. For example, the caption smoother 120 may take an average of multiple portions of audio and determine whether to assign an on or off score to those portions based on whether the average exceeds a threshold.

The binary scores are converted to the non-speech captions 155 by the caption smoother 120 for each class of non-speech sound to be stored in the content store 140. The caption smoother 120 may store the non-speech captions 155 according to the format described above for non-speech captions 155. For example, the caption smoother 120 may determine at which portion of the audio the binary score for a class of non-speech sounds changes to "on" (or "1"). The caption smoother 120 stores a start timestamp corresponding to the timestamp of the portion of the audio for which the score changed to the "on" score. The caption smoother 120 determines at which subsequent portion the binary score changes to "off" (or "0"). At this point, the caption smoother 120 notes an end timestamp corresponding to the timestamp of the portion of the audio for which the score change to the "off" score. The caption smoother 120 repeats this for the changes in the scores for each set of binary scores, and generates one or more start and end timestamps for each class of non-speech sounds (i.e., each class of binary scores). The caption smoother 120 may store in the content store 170 these start and end timestamps along with an identifier or label of the corresponding class of non-speech sound associated with the particular set of binary scores.

Content System—Caption Server

The caption server 180 includes a caption display module 125 combines the speech captions 150 and non-speech captions 155 in to a combined set of captions for presentation to a user of a content item. The caption display module 125 also generates the desired format and visual presentation of the combined set of captions and may store this along with the combined captions. When combining a set of speech captions 150 and non-speech captions 155 for a content item, the caption display module 125 may first synchronize the two caption types according to timestamp information within each set of captions. For example, a speech caption 150 may indicate that at a first timestamp a particular dialogue was spoken in the audio of a content item. The non-speech captions 155 for the same content item may indicate that at a timestamp that is five seconds from the first timestamp a non-speech sound of a certain class (e.g., laughter) occurs. These timestamps correspond to the timing of the audio of the content item. The caption display module 125, using this information, knows when the caption for the speech sound should be presented, and knows that the non-speech sound should be presented 5 seconds later.

The caption display module 125 may also determine how to visually present the captions to a user. In one embodiment, when a non-speech caption 155 and a speech caption 150 occur at the same time (i.e., have start and end timestamps that overlap), the caption display module 125 indicates that these two captions should be presented together according to various formats.

The caption display module 125 may also indicate the position on a display at which to display a caption. For example, the caption display module 125 may indicate that a caption should be presented at the top of the display. The caption display module 125 may also indicate that certain captions should be limited in duration.

The determinations made by the caption display module 125 regarding the visual formatting of the captions may be stored by the caption display module 125 in the content store 140 as sets of combined captions. Each entry in the combined captions for a content item may indicate a position, start and end timestamps, and content of the caption. Additional details regarding the caption display module 125 and the visual formatting of captions are described with reference to FIGS. 6 and 7.

III. Non-Speech Classifier

Figure 2:
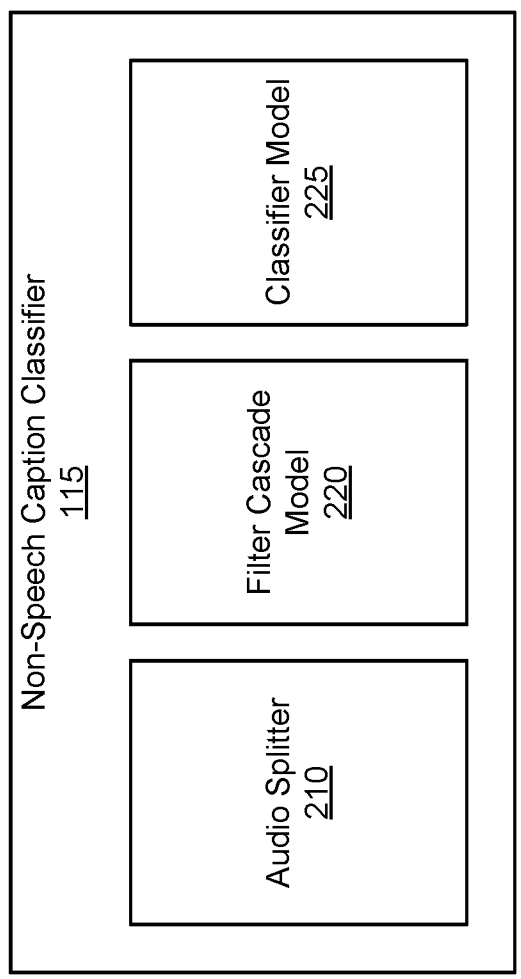
FIG. 2 is a high-level block diagram of the non-speech caption classifier, according, according to an embodiment.

FIG. 2 is a high-level block diagram of the non-speech caption classifier 115, according, according to an embodiment. The non-speech caption classifier of FIG. 2 includes an audio splitter 210, a filter cascade model 220, a classifier model 225. While certain elements are shown in FIG. 2, in other embodiments the environment may have different elements. Furthermore, the functionalities between elements may be distributed in a different manner in other embodiments, to different or multiple modules.

The audio splitter 210 splits the audio of a content item into different portions. Each content item may have an audio part. The audio part is of a certain duration. The audio splitter 210 splits the audio part into small segments a particular duration, with each segment offset from the start of a previous segment by an interval. In some cases, the duration of each portion is longer than the interval of time between each portion, and thus the portions (i.e., the audio segments) may overlap. For example, each portion may be separated by a 10 ms interval, and each portion may be 250 ms in duration. Thus, a 10 second audio clip would have 10,000 separate portions, with the first portion starting at 0 ms and ending at 100 ms, the second portion starting at 10 ms and ending at 110 ms, and so on. The last portion would start at 9,750 ms (i.e., 10,000 ms-250 ms) and end at 10,000 ms. Alternatively, the last portion may be shorter in duration and may not have a duration equal to the duration of the other portions.

The filter cascade model 220 receives from the audio splitter 210 the portions of the audio part of a content item and extracts features for each corresponding portion. In one embodiment, the filter cascade model 220 is based on the physiology of the human ear. The filter cascade model 220 may divide the input sound into multiple frequency channels, and include a cascade of multiple filters (with gain control coupled to each filter). Each filter filters out a particular range of frequencies or sounds, and the output from these various filters are used as the basis for the features, which will be used by a classifier model 225 to classify the non-speech sound in that portion of the audio for a class of non-speech sounds. In one embodiment, the output of the filters may be processed to generate auditory images which are used as the basis for the values of features for the classifier model 225.

In one embodiment, the filter cascade model 220 is a Cascade of Asymmetric Resonators with Fast-Acting Compression (or CAR-FAC) model. The CAR-FAC model is based on a pole-zero filter cascade (PZFC) model of auditory filtering, in combination with a multi-time-scale coupled automatic-gain-control (AGC) network. This mimics features of auditory physiology, such as masking, compressive traveling-wave response, and the stability of zero-crossing times with signal level. The output of the CAR-FAC model (a "neural activity pattern") is converted to capture pitch, melody, and other temporal and spectral features of the sound.

In another embodiment, a different type of model is used for the filter cascade model 220. For example, mel-frequency cepstral coefficients (MFCCs) may be used instead to generate features.

After the values of the features are generated by the filter cascade model 220, the non-speech caption classifier 115 inputs the values of the features into a classifier model 225. The non-speech classifier 115 may include multiple classifier models 225, with each classifier model 225 associated with a particular class of non-speech sounds. Each of the classifier models 225 may be a machine learning model, such as a neural network, a Bayesian network, a support vector machine, which accepts as input the values of the features for a portion of the audio and generates a raw score for that portion indicating the likelihood that a particular class of non-speech sound occurs at that portion of the audio. This raw score may be scaled from 0 (0% likelihood) to 1 (100% likelihood). For example, the classifier model 225 may indicate for a portion of the audio that the raw score (i.e., likelihood) of a laughter class of non-speech sound occurring at the portion is 0.5 (50%).

To train each of the classifier models 225, a training set of data (i.e., ground truth) including audio tracks and corresponding caption labels indicating the classes of non-speech sounds within those audio tracks is used. This training data may be retrieved from the content store 110, which may have speech and non-speech captions for audio that has been created by trusted users. This training may occur periodically as additional training data is received. The training data may also be retrieved or received from a third party (e.g., a corpus of data). Each of the classifier models 225 may train itself, or the training may be performed by an administrator or other user. The goal of the training may be to determine weights for the features of each of the classifiers within model 225 that achieve a good predictability of the occurrence of the classes of non-speech sounds. These weights may be verified by a validation set of data (e.g., a holdout set of data).

Some classes of non-speech sounds may typically occur within shorter durations compared to others (e.g., a gunshot sound lasting 50 ms), and some classes of non-speech sounds may have longer durations on average compared to other classes (e.g., music). The parameters of the machine learning model may be adjusted based on the expectations of the durations of the different classes of non-speech sounds. For example, a classifier model 225, when used to detect class of non-speech sound that is short lived, may be set to weigh a potential match to the short lived non-speech sound higher compared to classes of non-speech sounds that are of more typical length. Additionally, as the training data may not be completely accurate, the classifier model 225 may weigh the training data differently based on the class of non-speech sounds being considered and/or the source of the training data.

IV. Exemplary Non-Speech Classifier Raw Score Plot

Figure 3:
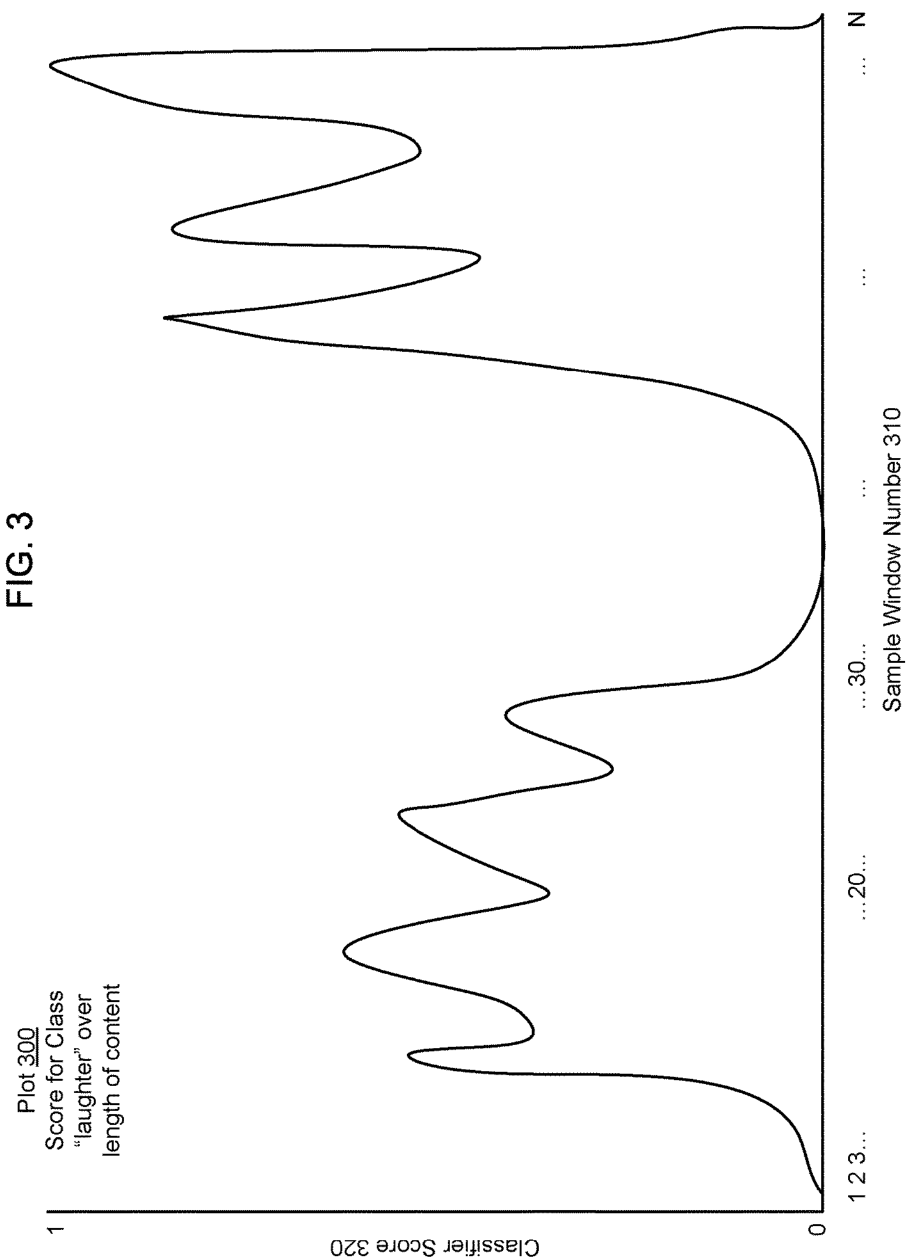
FIG. 3 illustrates an exemplary plot of the output of raw scores from the non-speech caption classifier for an exemplary class, according to an embodiment.

FIG. 3 illustrates an exemplary plot 300 of the output of raw scores from the non-speech caption classifier 115 for an exemplary class "laughter", according to an embodiment. As shown in FIG. 3, the raw scores are generated by the non-speech caption classifier 115 over the duration of the audio for the content item, for each sample window. As illustrated in FIG. 3, there are N number of sample window numbers 310 shown on the horizontal axis. Each sample window number 310 represents a portion of the audio as described above. The non-speech caption classifier 115 generates a raw score for each of these portions, and this raw score is indicated as a classifier score 320 in FIG. 3, as the vertical axis. For example, if the class shown in plot 300 is for laughter, then the plot 300 indicates the likelihood that a portion of the audio has an occurrence of the laughter class of non-speech sound. As can be seen in FIG. 3, the raw scores fluctuate significantly from one portion to the next. Note that although the curve shown in FIG. 3 may seem continuous for ease of illustration, the actual raw scores that are generated are discrete values.

V. Exemplary Process for Caption Smoothing

Figure 4:
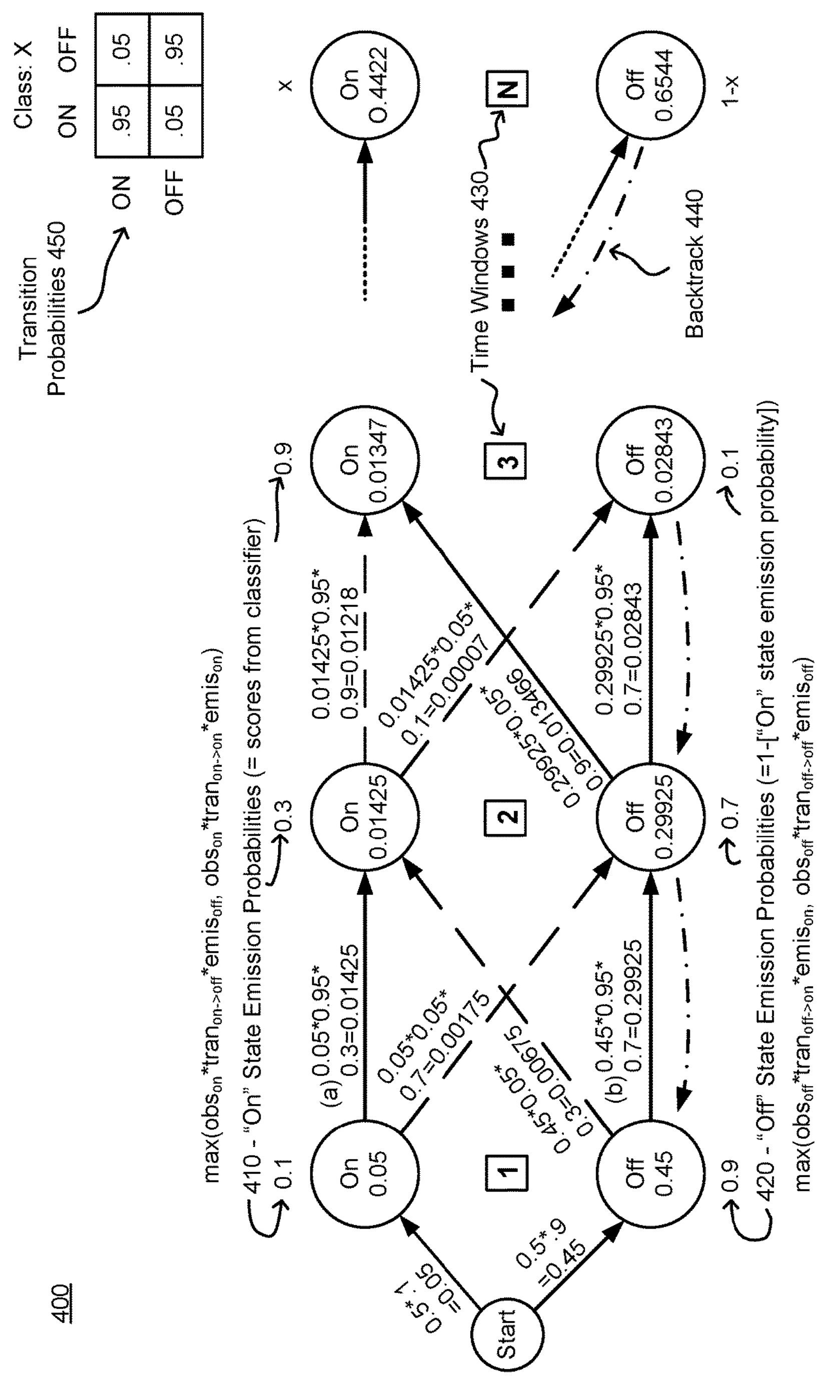
FIG. 4 is an exemplary trellis diagram illustrating the process of smoothing using a modified Viterbi algorithm as performed by the caption smoother, according to an embodiment.

FIG. 4 is an exemplary trellis diagram 400 illustrating the process of smoothing using a modified Viterbi algorithm as performed by the caption smoother 120, according to an embodiment. As noted previously, the caption smoother 120 smooths the raw scores generated by the non-speech caption classifier 115, and generates a set of binary scores for each class for the audio of a content item. To perform this smoothing, the caption smoother 120, in one embodiment, uses a modified Viterbi algorithm. As shown in FIG. 4, the caption smoother 120 determines the most likely probability for the hidden states of "on" or "off" throughout the entire duration of the audio of the content item. The on state indicates that the class of non-speech sound is present in the portion corresponding to the state, and the off state indicates the opposite, that the class of non-speech sound is not present.

Emission probabilities represent the likelihood of an observation given a particular state in a sequence. Here, the emission probabilities 410 and 420 used by the caption smoother 120 are the raw scores generated by the non-speech caption classifier 115. As noted, each raw score corresponds to a portion of the audio and a particular class of non-speech sound. In particular, the emission probabilities 410 for the on states correspond directly to the raw scores, and the emission probabilities 420 of the off states correspond to the inverse of the raw scores (e.g., 1-[raw score]).

The transition probabilities are indicated at the table of transition probabilities 450. As shown, the transition probabilities 450 are set such that they strongly favor no transition of states from on to off or vice versa. For example, the illustrated transition probabilities 450 between on and off or vice versa is 5% (i.e., only a 5% probability of transition between different states). This helps to ensure that changes between states (e.g., on to off or off to on) are rare, hence achieving the desired smoothing effect.

The caption smoother 120 determines a path through the trellis diagram as shown to find the path that has the highest probability (i.e., the Viterbi path). For each state, the caption smoother 120 determines the probability to reach either of the next two states (e.g., on or off). The probability is based on the current observation probability value (e.g., "$obs_{on}$" or "$obs_{off}$") multiplied by the emission probability value (e.g., "$emis_{on}$" or "$emis_{off}$") multiplied by the transition probability value (e.g., "$trans_{on->on}$," "$trans_{on->off}$," etc.). The caption smoother 120 selects the path to each subsequent state that has the highest probability, and the caption smoother 120 iterates through each time window 430 until it reaches the last one. As illustrated in FIG. 4, the calculated "on" emission probabilities are 0.1, 0.3, and 0.9, for the first, second, and third example time windows 430 (which are shown with rectangular outlines for ease of identification), each time window 430 corresponding to a portion of audio (i.e., the first time window corresponds to the first portion).

Thus, for example, as shown in FIG. 4, at the first time window 430, the path to the next "on" state with the highest probability is the one from the "on" state of first time window 430 (this path is indicated by an "(a)"), and the path to the next "off" state with the highest probability is the one from the current off state (indicated by a "(b)"). The observation probability of the next state is this maximum probability as computed from the prior state. For example, the observation probability of the "off" state at the second time window 430 is 0.22925, which is equal to the prior observation probability of the prior off state multiplied by the transition probability of off->off multiplied by the emission probability at the second time window.

Once the caption smoother 120 reaches the last time window 430 (indicated by N in the figure), the caption smoother 120 determines which of the states at the last time window 430, "on" or "off", have the highest probability value. For example, as shown, the "off" state has the highest probability value of 0.6544. The caption smoother 120 determines the backtrace 440 path (which is labeled with arrows having a dot-dash pattern) that resulted in this maximum probability state and reconstructs the "off" and "on" states along the backtrace 440 path. For example, the path to the "off" state in the last time window 430 may have come from an "on" state, which might have come from another "on" state, and so on.

The sequence of on and off states that the caption smoother 120 determines using this method is used by the caption smoother 120 to generate the binary scores indicating whether the particular class of non-speech sound occurs at each portion of the audio. The binary scores may be represented numerically, such that an on state may correspond to a score of 1, whereas an off state may correspond to a score of zero. Thus, a sequence of "off, off, off, on, on, on" would correspond to a set of binary scores of "0, 0, 0, 1, 1, 1."

In one embodiment, the caption smoother 120 may first apply a multiplier to a set of raw scores for a class depending upon the class of non-speech sound (as well as normalize the scores between classes). Some classes of non-speech sound have a small sample size in the training set. For these classes, the caption smoother 120 may apply a multiplier to the raw score corresponding to that class that increases the value of the raw score. For example, for a class of non-speech sounds indicating gunshots, the lower amount of training data for this class of sound make create a situation where the raw scores for when a gunshot sound actually occurs in a portion of the audio is small. Thus, the caption smoother 120 may apply a multiplier (e.g., 1.1×) to the class indicating gunshot sounds before smoothing the raw score. This multiplier allows the gunshot class of non-speech sounds to be emphasized such that they are more likely to receive an "on" score, whereas previously due to the small size of the training set, the raw scores may not have been as high as other classes for the same occurrence of the non-speech sound.

To validate these multipliers and/or the classifier feature weights used in the caption generation process, the caption smoother 120 may test the smoothing process with a selected set of multipliers and classifier feature weights against a validation set of data. The caption smoother 120 may determine the precision and recall of the prediction made by the caption smoother 120 compared to the caption information in the validation set. If the threshold values for precision and recall, which may be different for each class of non-speech sounds, is not met, the caption smoother 120 may adjust the multipliers and may also adjust the parameters of the non-speech caption classifier 115 to reach the acceptable precision and recall levels. Alternatively, the caption smoother 120 may fit a curve to a plot of the number of times a particular class of non-speech sounds occurs, and use this to determine whether the weights and other parameters are accurate.

In one embodiment, in order to improve efficiencies, the caption smoother 120 prunes those paths that have been traversed when generating the probabilities for the sequences of states that are unlikely to be used. For example, these paths may have a probability score below a certain threshold. These are the paths shown in FIG. 4 as arrows with solid line patterns.

VI. Exemplary Output of Binary Scores from Smoothing

Figure 5:
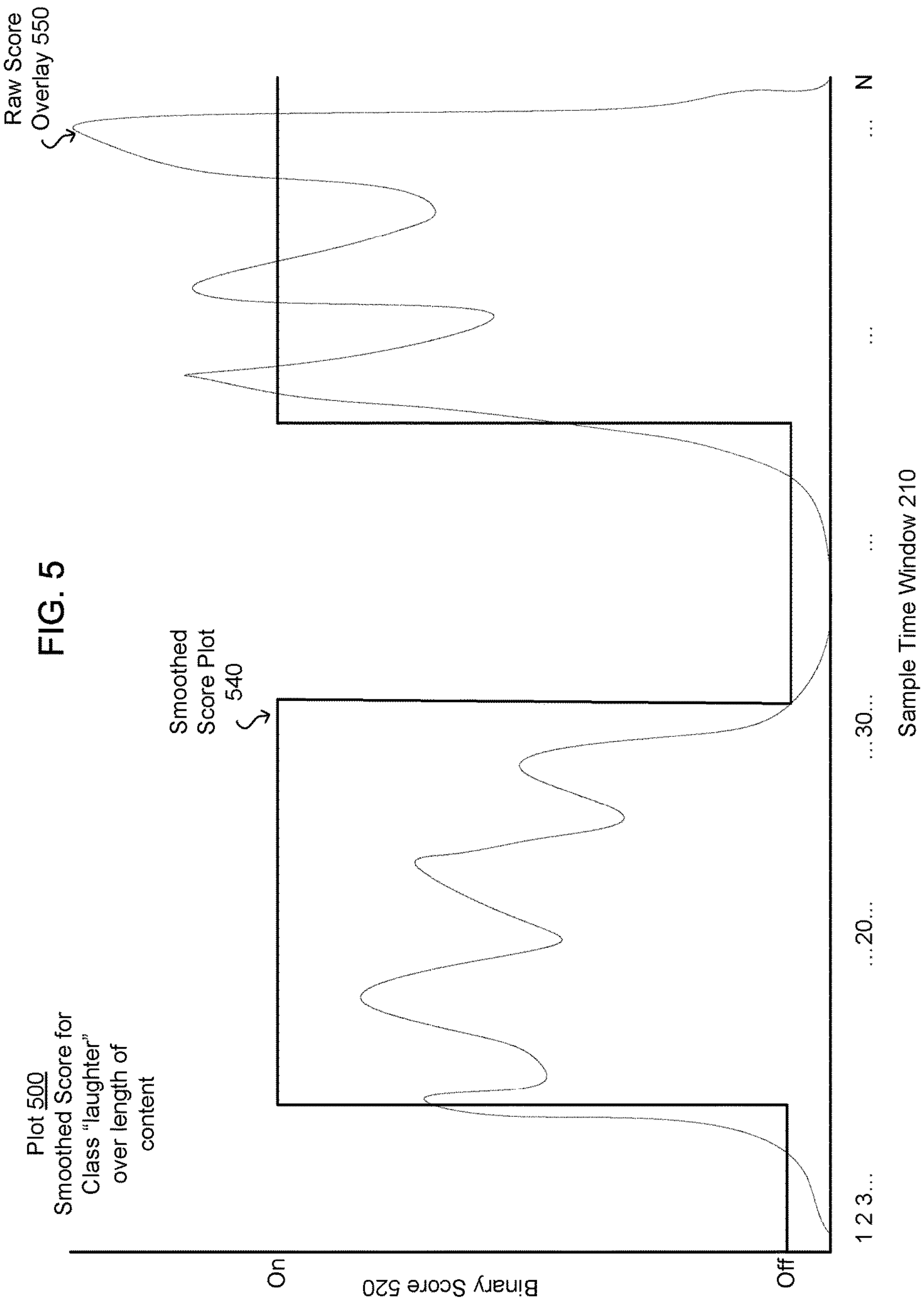
FIG. 5 illustrates an exemplary plot having an exemplary output of binary scores from the caption smoother for the raw scores shown in FIG. 3, according to an embodiment.

FIG. 5 illustrates an exemplary plot 500 having an exemplary output of binary scores from the caption smoother 120 for the raw scores shown in FIG. 3, according to an embodiment. As shown, the horizontal axis remains as the sample time windows 210, however, the vertical axis is now a simple binary score instead of a range of classifier scores as in FIG. 3 for the raw scores. As shown in FIG. 5, the smoothed score 540 represents the plot of the binary scores, and moves between the off and on (e.g., 0 and 1). The prior raw score from FIG. 3 is overlaid as the raw score overlay 550. As can be seen in FIG. 5, the smoothed score plot 540 roughly follows the raw score overlay 550, but includes fewer fluctuations. Thus, the binary score generated by the caption smoother 120 is more stable such that the time periods between on/off transitions are generally longer, which is consistent with a goal of creating non-speech captions that have a duration that is long enough for a user to be able to read before having the caption disappear. Additionally, the stability prevents a flicking effect where the non-speech captions transition rapidly between on and off due to the changes in the raw score. Note that the plots here may not be drawn to scale, and may not be computationally accurate, but are rather shown for illustrative purposes.

VII. Exemplary Output of Multiple Binary Scores from Smoothing

Figure 6:
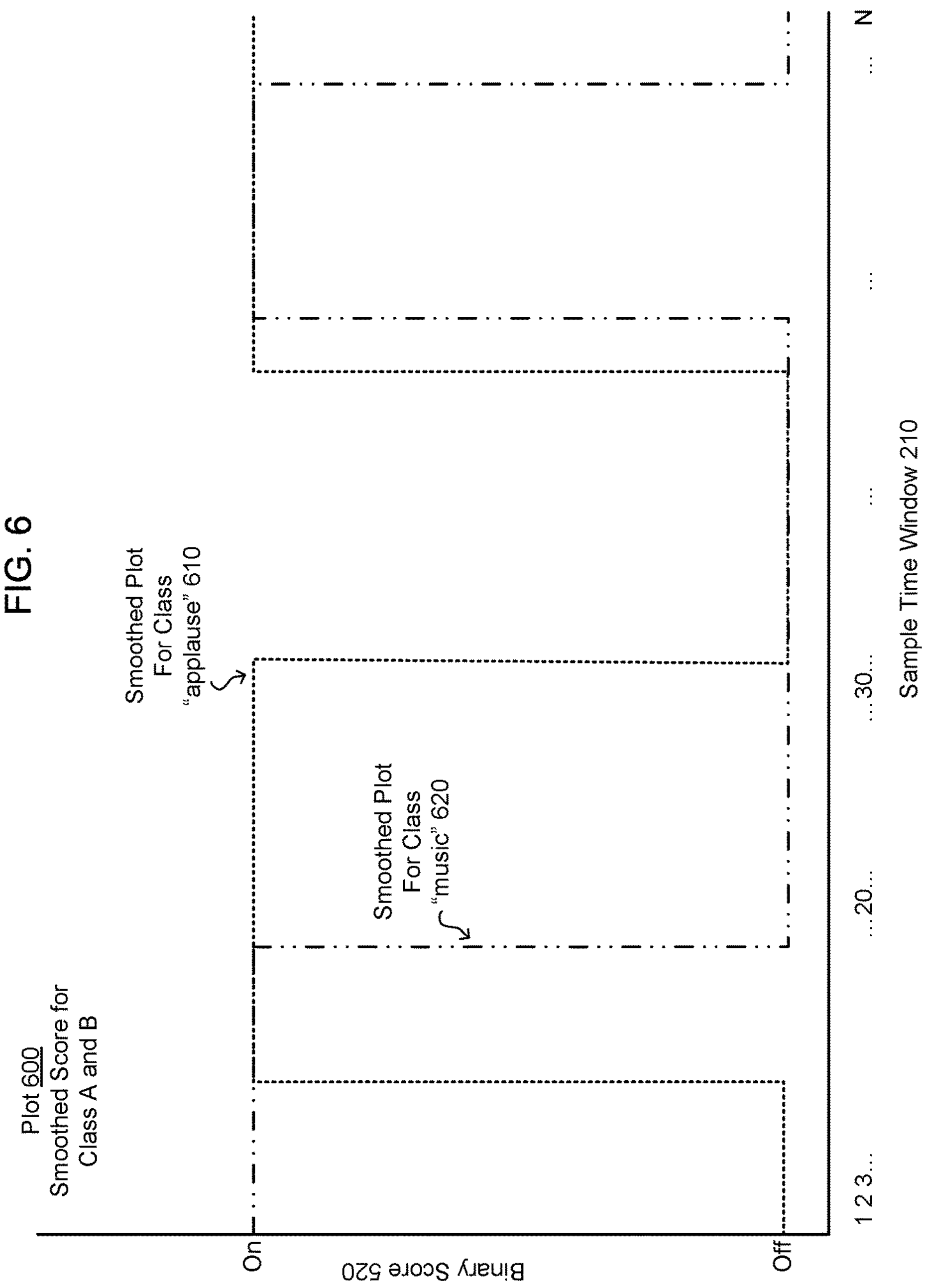
FIG. 6 illustrates an exemplary plot having smoothed scores for two different classes of non-speech sounds, according to an embodiment.

FIG. 6 illustrates an exemplary plot 600 having smoothed scores for two different classes of non-speech sounds, according to an embodiment. The caption smoother 120 may generate a set of binary scores for each class of non-speech sounds in the audio from a corresponding set of raw scores generated by each classifier model 225. Two sets of binary scores are shown in the plot 600 of FIG. 6. The first smoothed plot 610 is for a class "applause" of non-speech sounds. The second smoothed plot 620 is for a class "music" of non-speech sounds. As clearly shown, these binary scores may overlap in portions where they both indicate an on or off state, and do not need to be coordinated with each other. As noted previously, in cases where two non-speech captions for different classes overlap, the caption display module 125 determines how the two captions should be presented to the user.

As shown in FIG. 6, in the cases where the smoothed plot 610 and the smoothed plot 620 overlap in the on state, the caption display module 125 determines that two different non-speech captions corresponding to the classes represented by the binary scores for each respective plot may be presented to a user during the presentation of the corresponding content item 145 when the binary score for each plot is in an "on" state. The caption display module 125 also determines a visual placement and format for these two non-speech captions. While only two smoothed plots are shown in FIG. 6 for two sets of binary scores for two classes of non-speech sounds, in other embodiments a set of binary scores may be generated by the content server 110 for each one of the classes of non-speech sounds.

VIII. Caption Compilation

Figure 7:
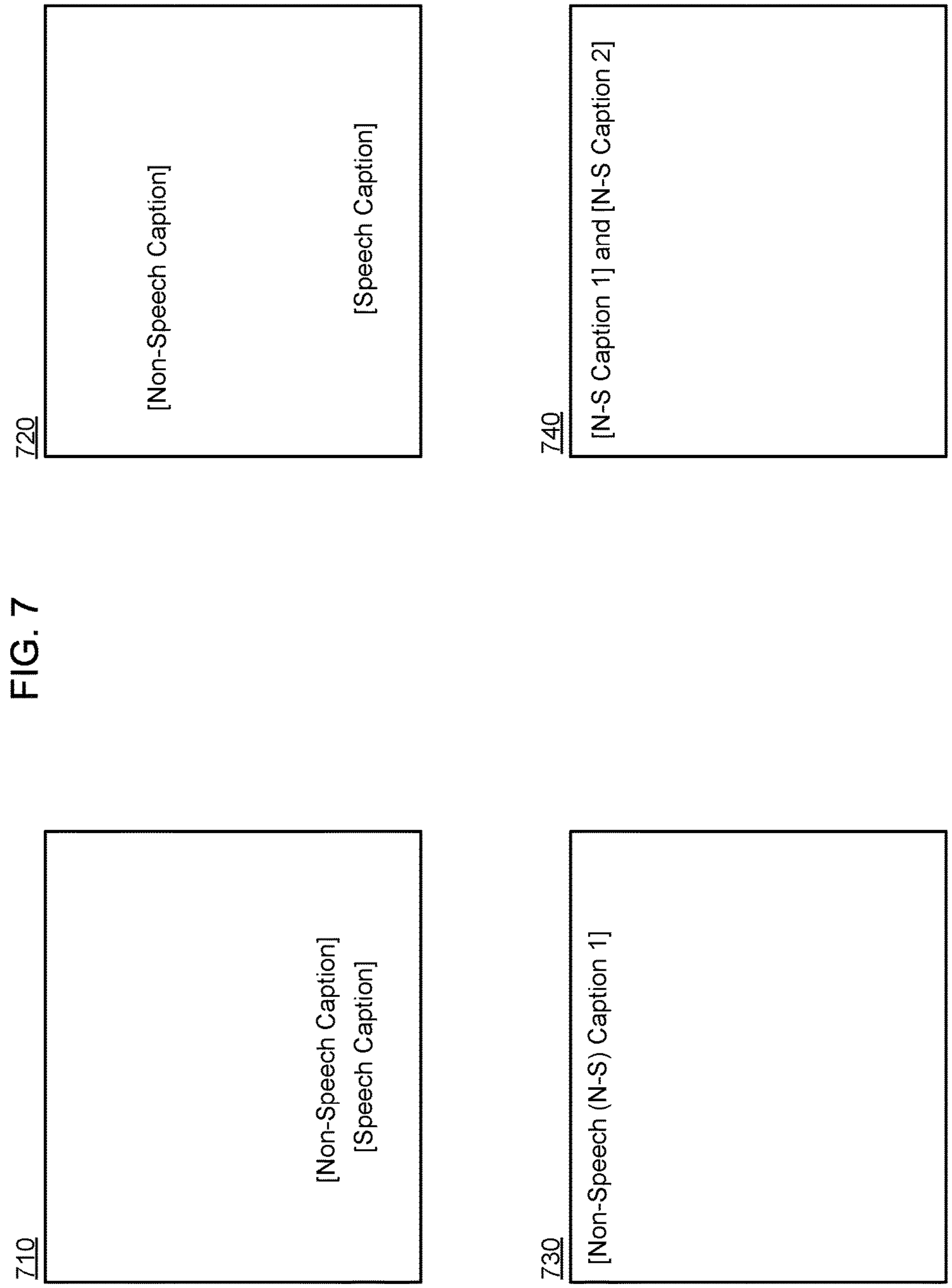
FIG. 7 illustrates various examples of caption placement and format as determined by the caption compiler, according to an embodiment.

FIG. 7 illustrates various examples of caption placement and format as determined by the caption display module 125, according to an embodiment. The caption display module 125 combines the speech captions 150 and the non-speech captions 155 corresponding to the audio part of a single content item to be presented to a user, and the caption display module 125 may also determine how to visually present the combined captions to the user. As noted above, in some cases, the class of the non-speech captions 155 entries are indicated using an identifier, and so the caption display module 125 may look up the identifier in a table to determine the label/class associated with the identifier. The caption display module 125 indicates that this label should be presented for the corresponding non-speech caption 155.

One example of a presentation of captions is illustrated in frame 710, which shows a rectangular shape representing the boundaries of a video frame for a content item that may be presented to a user. In the example shown in the frame 710, both a speech caption and a non-speech caption have start and end timestamps that overlap with each other, and thus the speech and non-speech captions are to be presented at the same time. In such a case, the caption display module 125 may indicate that the speech caption and the non-speech caption be presented on different lines, separated vertically from each other by a line spacing (e.g., single line spacing), and at a particular position on the screen (e.g., 20 pixels from the bottom of the screen). If the start and end timestamps for these two captions are such that they do not completely overlap, the caption display module 125 may also indicate that when only a single caption is to be shown, this caption should be centered at a point between the two captions shown in the frame 710. Alternatively, the caption display module 125 may determine that one of the captions, e.g., the speech caption, should always be placed a certain vertical distance from the bottom of the frame, and the other caption, e.g., the non-speech caption, should be presented above the speech caption if there are captions with overlapping timestamp ranges. As yet another alternative, the caption display module 125 may determine that speech captions should always be presented at one position on the frame, and non-speech captions should always be presented at another position on the frame such that the two captions do not visually overlap with each other if both are presented at a same time.

Another example of a presentation of captions is shown in frame 720. In this frame, the caption display module 125 has indicated that the non-speech caption should be presented offset from the center of the frame and nearer the top-left corner. This may be the location in the frame 720 representing where the non-speech sound was generated. For example, if the frame 720 is presenting a video, and someone is shown to be laughing in the video, the non-speech caption may indicate "laughter" at a position on the frame 720 near location in the frame 720 of the laughing individual. To determine the locations in the frame 720 corresponding to the non-speech sounds, the caption display module 125 may utilize a convolutional neural network that analyzes the images of a video or image shown in the frame 720 to recognize objects (e.g., a laughing person) in an image.

Another example of a presentation of captions is shown in frames 730 and 740. In this case, two non-speech captions overlap with each other with regards to start and end timestamps. In one embodiment, the caption display module 125 may indicate that these non-speech captions should be presented on different lines, similar to the presentation of the speech and non-speech captions in frame 710. However, in another embodiment, the caption display module 125 may indicate that the non-speech caption that has the earlier (or earliest) start timestamp should be presented offset to the left of the frame 730. Subsequently, after the start timestamp of the other non-speech caption is reached, the caption display module 125 indicates that the other non-speech caption should be presented on the same line as the first one, joined together with a conjunctive phrase or symbol ("and" in this illustration). If the second caption has an earlier end timestamp, then the caption display module 125 may indicate that the presentation of the first timestamp revert back to the presentation shown in frame 710. If the first timestamp has an earlier end timestamp, the caption display module 125 may indicate that the conjunction and the first non-speech caption be removed from presentation, with the second non-speech caption being presented on the right side (with no movement). This allows two non-speech captions to be presented side by side, but prevents a visually unappealing issue where the captions are shifted and centered repeatedly as different captions are "merged" in and out of the frame.

In some cases, the caption display module 125 may indicate a limit to the number of non-speech captions that are presented at one time. For example, the caption display module 125 may limit the presentation of the non-speech captions to a maximum number, and may indicate that separate non-speech captions be presented together until the maximum number is reached. The caption display module 125 indicates that subsequent non-speech captions that are to be presented are only presented when the number of non-speech captions being presented drop below the maximum number. In another embodiment, the non-speech captions are prioritized according to their respective classes. Those classes of non-speech sounds that may not easily be discernable from a visual inspection of the video being presented (e.g., "music") may be prioritized, and other non-speech sounds (e.g., "door open/close sounds") may be lower in priority.

In some cases, a non-speech caption may last for the duration of a content item, or may have a start and end timestamp range that cover a significant percentage of the duration of the content item (e.g., 90%). In such a case, the caption display module 125 may not indicate that the non-speech caption should be presented for the entire duration of its timestamp range. Instead, the caption display module 125 may indicate that the non-speech caption should be presented during a period of time (e.g., 5 seconds) during the beginning of the presentation of the content item, with an addendum to the non-speech caption indicating that it occurs for the duration of the content item (e.g., the addendum may indicate "throughout"). Alternatively, the caption display module 125 may indicate an addendum to the non-speech caption indicating that it has begun (e.g., "start"), and may after a duration of time indicate that the non-speech caption should be shown again, with an addendum indicating that it is still occurring (e.g., "continues"), and when the end timestamp of that non-speech caption is encountered, the caption display module 125 may indicate that the non-speech caption be shown again, with an addendum indicating that it is ended (e.g., "ends"). For example, the caption display module 125 may indicate that a non-speech caption be shown with the text "music starts" during the beginning three seconds of the presentation of a content item, periodically show "music continues" every 30 seconds during the presentation of the content item, and "music ends" when the end timestamp of the non-speech caption is reached.

In some cases, a non-speech caption may be of a very short duration (e.g., 0.5 seconds). In this case, the caption display module 125 may indicate that the non-speech caption be shown for a minimum duration (e.g., 1 second). In one embodiment, the caption display module 125 may combine the speech and non-speech captions into a single caption based on the start and end timestamps of each caption. For example, the caption display module 125 may indicate that a combined caption should read "[laughter] No Mr. Bond I expect you to die!"

IX. Exemplary Flow for Automatic Generation of Non-Speech Captions

Figure 8:
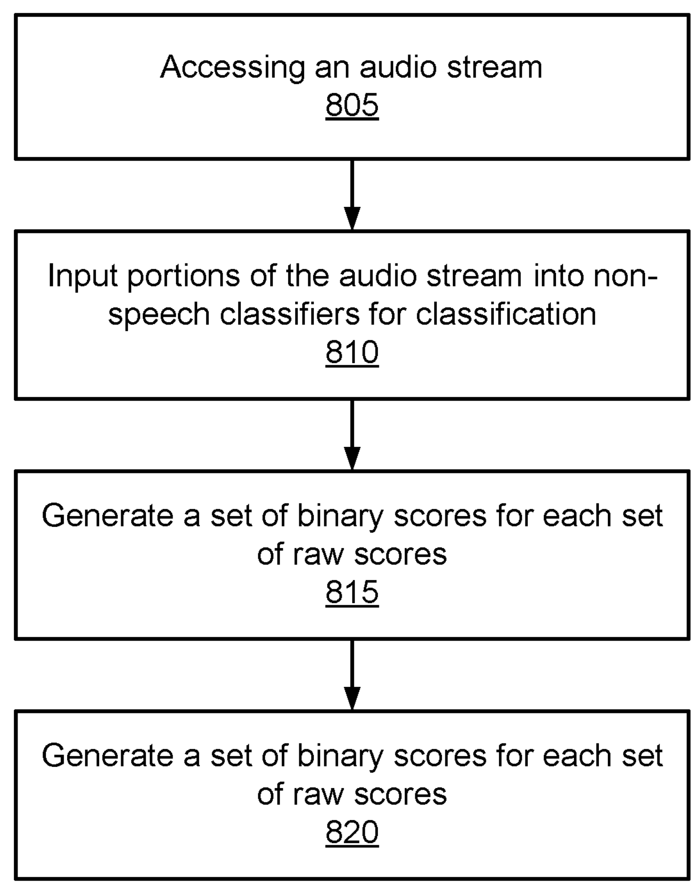
FIG. 8 is a data flow diagram illustrating the actions of the content server 110 for the automatic generation of non-speech captions from an audio input, according to an embodiment.

FIG. 8 is a data flow diagram illustrating the actions of the content server 110 for the automatic generation of non-speech captions from an audio input, according to an embodiment. Initially, the content server 110 accesses 805 the audio stream. This may be a standalone audio stream (e.g., a podcast), or an audio stream that is the audio portion of a video.

The content server 110 inputs 810 portions of the audio stream into one or more non-speech classifiers for classification. Each non-speech classifier generates, for each portion of the audio stream, a set of raw scores representing the likelihood that the respective portion of the audio stream includes an occurrence of a particular class of non-speech sound. The classes of non-speech sounds may include those listed above, such as laughter, music and so on. Each non-speech classifier generates raw scores for a particular class of non-speech sounds.

To do this, the content server 110 divides the audio stream into portions, each portion being of a particular duration and offset from the start of the previous portion by a particular interval. For example, the content server 110 divides the audio stream into 250 ms portions, with each portion being shifted 10 ms from the prior portion. This means that the portions overlap with each other.

The content server 110 inputs each portion into each of the one or more non-speech classifiers. Each non-speech classifier generates the raw scores for a corresponding portion of the audio stream for a class of non-speech sound using a filter cascade model to filter an audio signal of each portion to generate an output with multiple frequency channels. This filter cascade model may be a CAR-FAC model as described above. The non-speech classifier also generates values for features based on the output from the filter cascade model, and uses a machine learning model to determine a raw score likelihood of the occurrence of the class of non-speech sound at the portion of the audio stream. This machine learning model may be a neural network.

The content server 110 generates 815 a set of binary scores for each of the sets of raw scores. Each set of binary scores is generated based on a smoothing of a respective set of raw scores, as described above. The smoothing of the respective set of raw scores may be determined based on the raw scores of the same class of non-speech sounds from neighboring portions of the audio stream in time. In other words, the smoothed value of one portion of the audio stream is based on the raw scores of neighboring portions of the audio stream.

In one embodiment, in order to perform the smoothing, the content server 110 determines a sequence of most likely binary scores for each set of raw scores. The sequence of binary scores corresponds to a sequence of "on" and "off" states. The emission probabilities of the "on" states corresponding to the raw scores of the set of raw scores, and the emission probabilities of the "off" states corresponding to an inverse of the raw scores. The transition probabilities are identified such that the probability of a transition between different states is lower than the probability of transitioning between the same states. This content server 110 may use a modified Viterbi decoding to determine this sequence.

In one embodiment, the emission probabilities of the "off" states correspond directly to the raw scores. In one embodiment, the emission probabilities are based on a deterministic function of the raw scores. For example, the deterministic function may be a scaling function. As another example, the deterministic function to compute the "off" states may be (1−Prob(on_score)).

The output from this determination indicates a sequence of on and off states. Due to the smoothing process, these on and off states do not fluctuate significantly but still accurately represent the non-speech sounds in the corresponding audio.

The content server 110 applies 820 a set of non-speech captions to portions of the audio stream in time. Each of the sets of non-speech captions is based on a different one of the set binary scores of the corresponding portion of the audio stream. In other words, the content server 110 applies different non-speech captions to the different portions of the audio stream. For example, if multiple portions of the audio stream includes laughter, then the non-speech caption for those sections include a laughter caption.

In one embodiment, the content server 110 applies the non-speech captions by identifying a plurality of non-speech captions for a plurality of classes of non-speech sounds. The content server 110, for each non-speech caption, identifies the set of binary scores associated with the class of non-speech sound for the non-speech caption. The content server 110 also determines one or more start and end timestamps for each set of binary scores based on the timestamps of the portions in time associated with each binary score. Using this information, the content server identifies a plurality of labels corresponding to the plurality of non-speech captions based on the class of non-speech sound associated with each non-speech caption. As noted above, each label may correspond to a particular class of non-speech sound. The content server 110 applies the plurality of labels corresponding to each non-speech caption based on the start and end timestamps for each non-speech caption.

In some cases, in response to determining that two or more non-speech captions have overlapping start and end timestamps, the content server 110 may also apply the labels of the two non-speech captions with a conjunctive phrase. In other words, the labels may be applied together, and joined using a conjunctive phrase such as "and." This allows multiple labels for non-speech sounds to be applied together, rather than one at a time.

The content server 110 may also apply a set of speech captions with the set of non-speech captions such that the speech captions and non-speech captions are synchronized in time. For example, as described above, the content server 110 may indicate that the speech and non-speech captions should be presented together to the user.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A method for smoothed captioning of non-speech sounds in an audio stream, comprising:

accessing the audio stream;

inputting portions of the audio stream into one or more non-speech classifiers for classification;

generating, by the non-speech classifiers, for one or more of the portions of the audio stream, a set of raw scores representing likelihoods that a respective portion of the audio stream includes an occurrence of a particular class of the non-speech sounds associated with each of the non-speech classifiers;

generating a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time, wherein for each of the one or more of the portions, a first binary value indicates that a first class of the non-speech sounds occurs in the respective portion, and a second binary value indicates that the first class of the non-speech sounds does not occur in the respective portion, the generating the set of binary scores for each of the sets of raw scores portion, the generating the set of binary scores for each of the sets of raw scores comprises:

determining, using transition probabilities and a sequence of emission probabilities, a sequence of most likely binary scores for each set of raw scores, the sequence of binary scores corresponding to a sequence of on states and off states, the sequence of emission probabilities of the on states corresponding to the raw scores of the set of raw scores and the sequence of emission probabilities of the off states corresponding to a function of the raw scores, and the transition probabilities predefined such that a probability of a transition between different states is lower than a probability of transitioning between the same states; and applying a set of non-speech captions to portions of the audio stream in time, each of the sets of non-speech captions based on a different one of the set binary scores of the corresponding portion of the audio stream.

2. The method of claim 1, wherein inputting portions of the audio stream into one or more non-speech classifiers for classification further comprises:

dividing the audio stream into portions, each portion being of a particular duration and offset from a start of a previous portion by a particular interval;

inputting each portion into each of the one or more non-speech classifiers, where each non-speech classifier generates the raw scores for a corresponding portion of the audio stream for a class of non-speech sound by:

using a filter cascade model to filter an audio signal of each portion to generate an output with multiple frequency channels;

generating values for features based on the output from the filter cascade model; and using a machine learning model to determine a raw score likelihood of the occurrence of the class of non-speech sound at the portion of the audio stream.

3. The method of claim 1, wherein the determination of the sequence of most likely binary scores uses Viterbi decoding.

4. The method of claim 1, wherein applying a set of non-speech captions to portions of the audio stream in time further comprises:

identifying a plurality of non-speech captions for a plurality of classes of non-speech sounds by:

for each non-speech caption, identifying the set of binary scores associated with the class of non-speech sound for the non-speech caption; and determining one or more start and end timestamps for each set of binary scores based on the timestamps of the portions in time associated with each binary score;

identifying a plurality of labels corresponding to the plurality of non-speech captions based on the class of non-speech sound associated with each non-speech caption; and applying the plurality of labels corresponding to each non-speech caption based on the start and end timestamps for each non-speech caption.

5. The method of claim 4, further comprising:

in response to determining that two or more non-speech captions have overlapping start and end timestamps, applying the labels of the two non-speech captions with a conjunctive phrase.

6. The method of claim 1, further comprising:

applying a set of speech captions with the set of non-speech captions such that the speech captions and non-speech captions are synchronized in time.

7. A computer program product for smoothed captioning of non-speech sounds in an audio stream comprising a non-transitory computer readable storage medium having instructions encoded thereon that, when executed by a processor, cause the processor to:

access an audio stream;

input portions of the audio stream into one or more non-speech classifiers for classification;

generate, by the non-speech classifiers, for one or more of the portions of the audio stream, a set of raw scores representing likelihoods that the respective portion of the audio stream includes an occurrence of a particular class of non-speech sounds associated with each of the non-speech classifiers;

generate a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time, wherein for a portion of the portions, a first binary value indicates that a first class of the non-speech sounds occurs in the portion, and a second binary value indicates that the first class of the non-speech sounds does not occur in the portion, and wherein to generate the set of binary scores for each of the sets of raw scores comprises to:

determine, using transition probabilities and a sequence of emission probabilities, a sequence of most likely binary scores for each set of raw scores, the sequence of binary scores corresponding to a sequence of on states and off states, the sequence of emission probabilities of the on states corresponding to the raw scores of the set of raw scores and the sequence of emission probabilities of the off states corresponding to a function of the raw scores, and the transition probabilities predefined such that a probability of a transition between different states is lower than a probability of transitioning between the same states; and apply a set of non-speech captions to portions of the audio stream in time, each of the sets of non-speech captions based on a different one of the set binary scores of the corresponding portion of the audio stream.

8. The computer readable storage medium of claim 7, wherein input of the portions of the audio stream into one or more non-speech classifiers for classification further comprises instructions to cause the processor to:

divide the audio stream into portions, each portion being of a particular duration and offset from a start of a previous portion by a particular interval;

input each portion into each of the one or more non-speech classifiers, where each non-speech classifier generates the raw scores for a corresponding portion of the audio stream for a class of non-speech sound by:

use a filter cascade model to filter an audio signal of each portion to generate an output with multiple frequency channels;

generate values for features based on the output from the filter cascade model; and use a machine learning model to determine a raw score likelihood of the occurrence of the class of non-speech sound at the portion of the audio stream.

9. The computer readable storage medium of claim 7, wherein the determination of the sequence of most likely binary scores uses Viterbi decoding.

10. The computer readable storage medium of claim 7, wherein the application of the set of non-speech captions to portions of the audio stream in time further comprises instructions to cause the processor to:

identify a plurality of non-speech captions for a plurality of classes of non-speech sounds by:

for each non-speech caption, identifying the set of binary scores associated with the class of non-speech sound for the non-speech caption;

determining one or more start and end timestamps for each set of binary scores based on the timestamps of the portions in time associated with each binary score;

identify a plurality of labels corresponding to the plurality of non-speech captions based on the class of non-speech sound associated with each non-speech caption; and apply the plurality of labels corresponding to each non-speech caption based on the start and end timestamps for each non-speech caption.

11. The computer readable storage medium of claim 10, further comprising:

in response to the determination that two or more non-speech captions have overlapping start and end timestamps, apply the labels of the two non-speech captions with a conjunctive phrase.

12. The computer readable storage medium of claim 7, further comprising:

apply a set of speech captions with the set of non-speech captions such that the speech captions and non-speech captions are synchronized in time.

13. A system for smoothed captioning of non-speech sounds in an audio stream, comprising:

a content system coupled to a network and configured to:

access an audio stream;

input portions of the audio stream into one or more non-speech classifiers for classification;

generating, by the non-speech classifiers, for one or more of the portions of the audio stream, a set of raw scores representing likelihoods that the respective portion of the audio stream includes an occurrence of a particular class of non-speech sounds associated with each of the non-speech classifiers;

generate a set of binary scores for each of the sets of raw scores, each set of binary scores generated based on a smoothing of a respective set of raw scores, the smoothing of the respective set of raw scores determined based on the raw scores of the same class of non-speech sounds from neighboring portions of the audio stream in time, wherein for a portion of the portions, a first binary value indicates that a first class of the non-speech sounds occurs in the portion, and a second binary value indicates that the first class of the non-speech sounds does not occur in the portion, and wherein to generate the set of binary scores for each of the sets of raw scores comprises to:

determine, using transition probabilities and a sequence of emission probabilities, a sequence of most likely binary scores for each set of raw scores, the sequence of binary scores corresponding to a sequence of on states and off states, the sequence of emission probabilities of the on states corresponding to the raw scores of the set of raw scores and the sequence of emission probabilities of the off states corresponding to a function of the raw scores, and the transition probabilities predefined such that a probability of a transition between different states is lower than a probability of transitioning between the same states; and apply a set of non-speech captions to portions of the audio stream in time, each of the sets of non-speech captions based on a different one of the set binary scores of the corresponding portion of the audio stream; and a client device coupled to the network and configured to:

receive content from a content server;

receive speech captions and non-speech captions; and present the content with the speech captions and non-speech captions to a user.

14. The system of claim 13, wherein the content system is further configured to, for the input of the portions of the audio stream into one or more non-speech classifiers for classification:

divide the audio stream into portions, each portion being of a particular duration and offset from a start of a previous portion by a particular interval;

input each portion into each of the one or more non-speech classifiers, where each non-speech classifier generates the raw scores for a corresponding portion of the audio stream for a class of non-speech sound by:

use a filter cascade model to filter an audio signal of each portion to generate an output with multiple frequency channels;

generate values for features based on the output from the filter cascade model; and use a machine learning model to determine a raw score likelihood of the occurrence of the class of non-speech sound at the portion of the audio stream.

15. The system of claim 13, wherein the determination of the sequence of most likely binary scores uses Viterbi decoding.

16. The system of claim 13, wherein the content system is further configured to, for the application of the set of non-speech captions to portions of the audio stream in time:

identify a plurality of non-speech captions for a plurality of classes of non-speech sounds by:

for each non-speech caption, identifying the set of binary scores associated with the class of non-speech sound for the non-speech caption;

determining one or more start and end timestamps for each set of binary scores based on the timestamps of the portions in time associated with each binary score;

identify a plurality of labels corresponding to the plurality of non-speech captions based on the class of non-speech sound associated with each non-speech caption; and apply the plurality of labels corresponding to each non-speech caption based on the start and end timestamps for each non-speech caption.

17. The system of claim 16, wherein the content system is further configured to:

in response to the determination that two or more non-speech captions have overlapping start and end timestamps, apply the labels of the two non-speech captions with a conjunctive phrase.

* * * * *